United States Patent [19]

Stephenson, III

[11] Patent Number: 5,276,473
[45] Date of Patent: Jan. 4, 1994

[54] MANUALLY SET BOUNCE FLASH WITH FOCUS SHIFT

[75] Inventor: Stanley W. Stephenson, III, Spencerport, N.Y.

[73] Assignee: Eastman Kodak Company, Rochester, N.Y.

[21] Appl. No.: 24,588

[22] Filed: Mar. 1, 1993

[51] Int. Cl.⁵ .................... G03B 3/00; G03B 15/03
[52] U.S. Cl. ................... 354/149.1; 354/195.1; 354/195.12
[58] Field of Search ............... 354/400, 149.1, 195.1, 354/195.12, 149.11

[56] References Cited

U.S. PATENT DOCUMENTS

| | | | |
|---|---|---|---|
| 3,286,611 | 11/1966 | Lange | 354/149.11 |
| 3,373,671 | 3/1968 | Jakob | 354/195.12 X |
| 5,194,885 | 3/1993 | Spencer | 354/149.1 |

*Primary Examiner*—W. B. Perkey
*Attorney, Agent, or Firm*—David A. Howley

[57] ABSTRACT

A system that produces sharper pictures by setting the lens of a camera to a closer focus position, when the flash unit of the camera is set to a bounce position. In this system, the reflector and lamp of the flash unit are pivoted to direct the light produced by the flash unto an overhead ceiling. The focus position of the lens is adjusted by coupling the motion of the lamp to the motion of the lens so as to move the focus range of the lens more nearly into the range of the bounce flash.

9 Claims, 3 Drawing Sheets

MANUALLY SET BOUNCE FLASH WITH FOCUS SHIFT

FIELD OF THE INVENTION

The invention relates generally to the field of photographic cameras, and particularly to photographic cameras that have built-in flash units.

BACKGROUND OF THE INVENTION

Many cameras have a built in flash unit. The flash unit is often located close to the optical axis of the camera lens. When the flash is located in the above position, flash from this position often results in unflattering illumination of the subject. Sometimes, the flash even enters the pupil of the eye of the subject and produces a condition called red eye. Red eye is caused by the reflection of the flash from the blood vessels in the retina, which is reflected back into the camera as red light. When the flash unit is raised above the lens, the condition called red eye is removed.

The close association of flash unit and camera, even without red eye gives a rather uninteresting, flat form of lighting, which does not suit many subjects. To obtain more diffuse, softer lighting and hence better pictures the reflector assembly of the flash unit can be swivelled or tilted to produce a bounce flash.

The typical bounce flash technique is to aim the flash unit at the ceiling, which then becomes a broad source of diffuse illumination, overcoming problems of light fall-off. If the flash unit has a provision for tilting, it can be used on a camera, if not it must be hand-held or mounted on some fixed support.

Current camera systems typically include a flash unit for low light situations. The flash unit consists of a flash tube and a reflector that are designed to illuminate the scene area captured by the lens of the camera. When the shutter of the camera is opened, a capacitor discharges through the flash tube to create a burst of light. A large number of people would rather carry a smaller camera instead of a larger camera. Thus, the flash unit was made part of the camera to reduce the number of objects that an individual would have to carry and the flash unit was reduced in size to reduce the size of the camera. Hence, flash units on current small camera typically have a range of twelve feet. Larger flash units that supply greater illumination are not typically a part of small cameras or exist as independent flash units.

When a bounce flash is utilized, the effective flash range of the flash unit is reduced by approximately two stops and bounce flash for a 12 foot flash range may be reduced to less than 8 feet. The foregoing may be overcome, by increasing the aperture size of the camera.

Studies have shown that people desire to take pictures of objects that are located as close as 2½ feet from the camera. Cameras that are equipped with an autofocus feature sense the distance of the object and the accordingly set the focus of the lens to the subject distance. Cameras that incorporate the foregoing autofocus feature are more expensive than conventional cameras. As the aperture size of a camera lens increases the depth of field decreases, consequently increasing the desirability of a autofocus feature.

In moderately priced cameras it is advantageous to have a single focus point for the lens. When a bounce flash is added to a moderately priced camera, the flash range of the bounce flash unit is reduced making the bounce flash unit useful only in a close up mode. The foregoing necessitates a focus shift of the lens. The prior art discloses either sophisticated adjustments in exposure and/or lens focus to optimize picture quality. Prior systems that utilized optimized flash bounce use autofocus technology.

PROBLEMS TO BE SOLVED BY THE INVENTION

One of the disadvantages of the above bounce flash system is that the system requires autofocus technology to create the focus shift for close up bounce flash pictures.

SUMMARY OF THE INVENTION

The present invention overcomes the disadvantages of the prior art by providing a system that is built into a camera, wherein the motion of the flash unit from a direct to a illumination position adjusts the focus position of the lens to a close up mode in the indirect lighting position.

In one case, a lever connects the motion of the flash unit and the lens location. By selectively locating the pivot location of the flash unit with a member connected to the flash unit a motion may be derived which moves the lens between a normal and close up mode. Thus, the focus position is automatically and inexpensively shifted between two illumination modes.

In a second embodiment, the flash position is sensed electronically, and a electromagnetic actuator adjusts the focus of the lens. The flash unit rotates around a pivot in order to be manually positioned in either a direct or indirect illumination mode. A lever formed on the rotating flash unit closes electrical contacts in one of the above two positions. The electrical contacts provide power to an electromagnetic actuator that moves the lens to a close up mode position.

ADVANTAGEOUS EFFECTS OF THE INVENTION

In moderately priced cameras, autofocus technology is not required to adjust the focus shift of a lens, when shifting to a bounce flash mode from a normal mode. Thus, high quality flash close up pictures may be produced with a moderately priced camera.

The foregoing is accomplished by providing a camera comprising a variable focal length lens adjustable to increase or decrease its focal length, and a flash unit, is characterized by: means supporting the flash unit for movement between a normal position facing the same direction as the lens and a bounce flash position angled with respect to the direction the lens faces; and means coupling the supporting means and the lens for decreasing the focal length of the lens as the flash unit is moved from its normal position to its bounce flash position and for increasing the focal length of the lens as the flash unit is swinging from its bounce flash position to its normal flash position.

DESCRIPTION OF THE PREFERRED EMBODIMENTS

Figure 1:
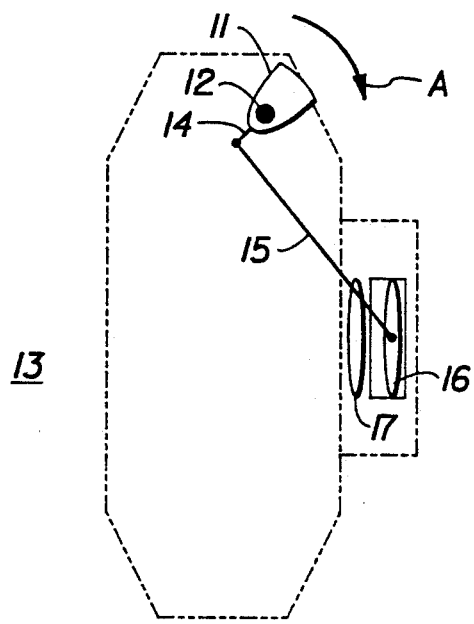
FIG. 1 is a side view of the apparatus of this invention in the bounce mode.

Referring now to the drawings in detail, and more particularly to FIG. 1, the reference character 11 represents a flash unit, that has an arm 14 attached thereto. Flash unit 11 is connected through pivot 12 to camera 13. One end of arm 14 is connected to one end of lens shift lever 15. Lever 15 is shown as a straight solid member. It is obvious to one skilled in the art that lever 15 may assume a variety of shapes to fit within the body of camera 13. Compliant action may also be built into lever 15. The other end of lever 15 is connected to forward lens assembly 16. Stationary lens 17 is positioned behind lens 16. The foregoing shows flash unit 11 in the bounce flash mode position with lens 16 in a forward position to provide a close up focus mode. In this mode, the light and focus zones work in conjunction with each other to provide an optimum image range between 2½ and 8 feet.

Figure 2:
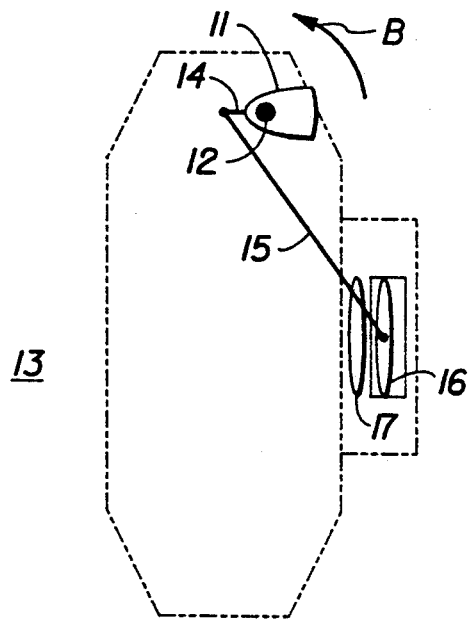
FIG. 2 is a side view of the apparatus of this invention in the normal mode.

FIG. 2 is a side view of the apparatus of the invention shown in FIG. 1, showing camera 13 in the normal focus mode. When one wanted to shift to the bounce flash mode and close up focus mode (shown in FIG. 1) to the normal flash mode and normal focus mode (shown in FIG. 2) one would push flash unit 11 in the direction shown by arrow A. Arm 14 would rotate about pivot 12 causing lever 15 to retract movable lens 16 into a normal focus mode position. If one wanted to shift from the normal focus mode position (shown in FIG. 2) to the bounce flash mode position (shown in FIG. 1) one would push flash unit 11 in the direction shown by arrow B. Arm 14 would rotate about pivot 12 causing lever 15 to move movable lens 16 forward into a close up focus mode position.

Flash unit 11 may assume various intermediate positions between the bounce flash mode position (shown in FIG. 1) and the normal focus mode position (shown in FIG. 2). Lens 16 may assume various positions between the close up focus mode position (shown in FIG. 1) and the normal focus mode position (shown in FIG. 2). The positions that flash unit 11 and lens 16 assume are dependent upon the distance that unit 11 was moved in direction A or direction B.

Figure 3:
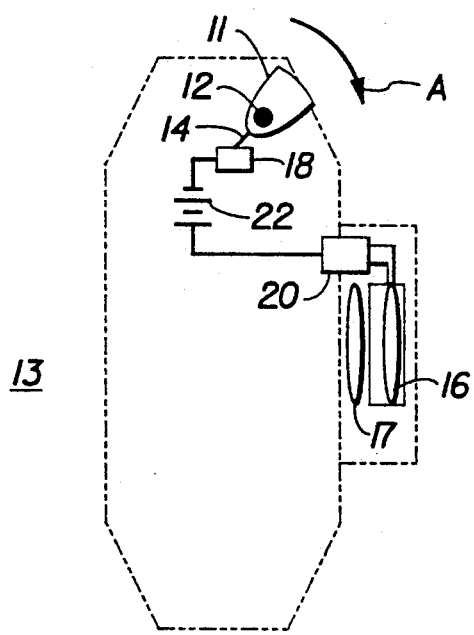
FIG. 3 is a side view of an alternate embodiment of the apparatus of this invention in the bounce mode.

FIG. 3 is a side view of an alternate embodiment of the apparatus of this invention. Flash unit 11 is shown in the bounce flash mode and lens 16 is shown in the close up focus mode. Flash unit 11 has an arm 14 attached thereto. Flash unit 11 is connected through pivot 12 to camera 13. Arm 14 selectively engages flash sensing switch 18. Switch 18 is coupled to one of the terminals of battery 22 and the other terminal of battery 22 is coupled to solenoid 20. The aforementioned components will cause forward lens 16 to be positioned in a forward close up mode position. This provides an optimum image range between 2½ and 8 feet.

Figure 4:
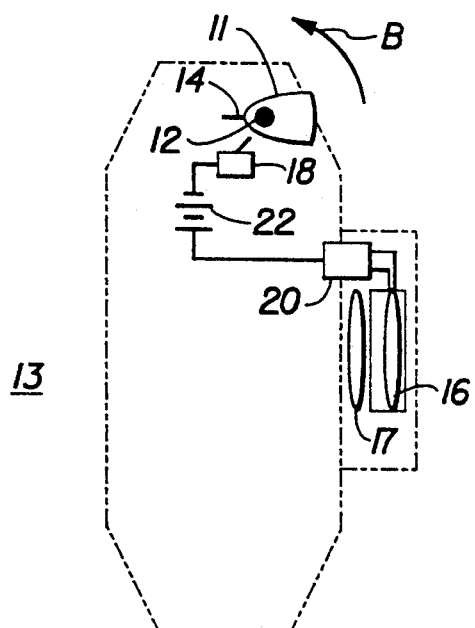
FIG. 4 is a side view of an alternate embodiment of the apparatus of this invention in the normal mode.

FIG. 4 is a side view of the apparatus (shown in FIG. 3) showing flash unit 11 in the normal flash mode and lens 16 in the normal focus mode. When one wanted to shift to the bounce flash mode and close up focus mode (shown in FIG. 3) to the normal flash mode and normal focus mode (shown in FIG. 4) one would push flash unit 11 in the direction shown by arrow A. Arm 14 would be disengaged from switch 18 causing battery 22 to deenergize solenoid 20. Spring 21 (shown in FIG. 5) will provide a return force to move lens 16 into a normal focus mode position, when solenoid 20 is deenergized. If one wanted to shift from the normal focus mode position shown in FIG. 4 to the bounce flash mode position shown in FIG. 3, one would push flash unit 11 in the direction shown by arrow B. Arm 14 would be connected to switch 18 causing battery 22 to energize solenoid 20. Solenoid 20 will provide a force to move lens 16 into a close up focus mode position.

Flash unit 11 may assume various intermediate positions between the bounce flash mode position (shown in FIG. 3) and the normal focus mode position (shown in FIG. 4). Lens 16 may assume various positions between the close up focus mode position (shown in FIG. 3) and the normal focus mode position (shown in FIG. 4). The positions that flash unit 11 and lens 16 assume are dependent upon the distance that unit 11 was moved in direction A or direction B.

Figure 5:
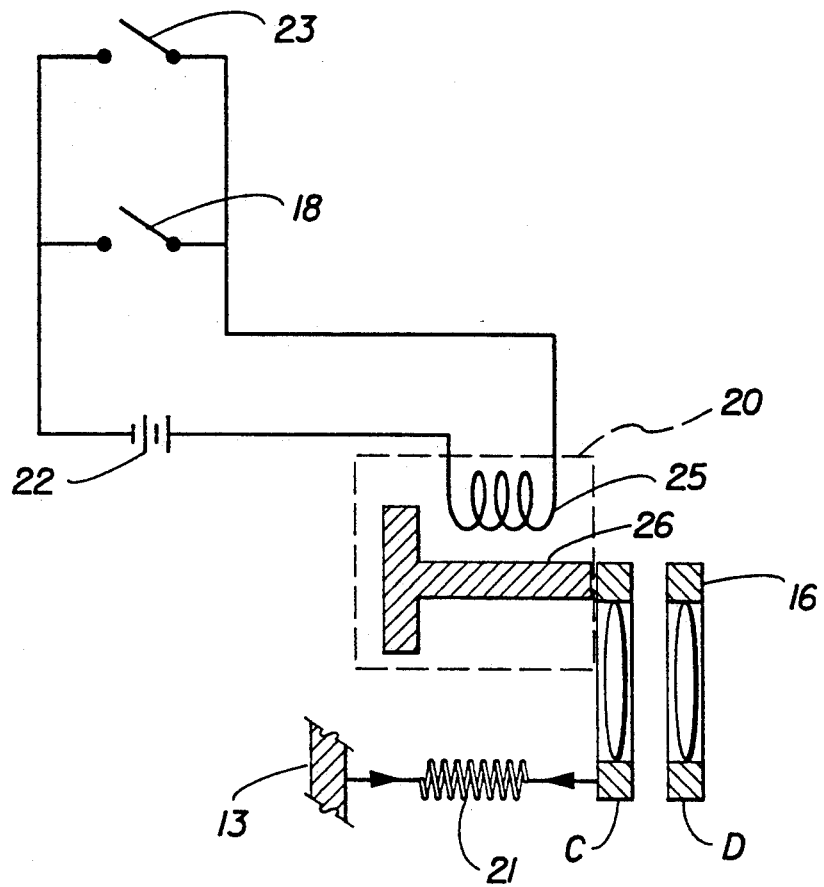
FIG. 5 is a schematic block diagram of the electronics of the apparatus of this invention.

FIG. 5 is a schematic block diagram of the electronics of the apparatus of this invention. Lens 16 is capable of moving between locations C and D. Lens 16 is connected to spring 21 and spring 21 is connected to camera body 13. Solenoid 20 comprises: a coil 25 and a bar 26. Bar 26 is connected to lens 16. One end of coil 25 is connected to the positive terminal of battery 22 and the other end of coil 25 is connected to one of the ends of bounce position switch 18 and one of the ends of alternate close up activation switch 23.

The other ends of switches 18 and 23 are connected to the negative terminal of battery 22. When switch 18 is open, lens 16 will be positioned in the normal focus mode position at location C. When switch 18 is closed, coil 25 will be energized causing bar 26 to push lens 16 to location D so that lens 16 will be correctly positioned for the bounce flash mode. When switch 18 is reopened solenoid 18 will become deenergized and spring 21 will drive lens 16 from location D back to location C.

Alternate close up switch 23 may be utilized to provide additional close up modes for camera 13. Switch 23 may be located on the outside of camera body 13 to allow the to select a particular close up mode without rotating flash unit 11. When switch 23 is open coil 25 will be deenergized and spring 21 will maintain lens 16 in the normal focus mode position (location C). When switch 23 is closed, coil 25 is energized forcing bar 26 to push front lens 16 into the close up position (location D). Pictures taken in this mode do not depend upon the operation of flash unit 11 or the position of flash unit 11.

Figure 6:
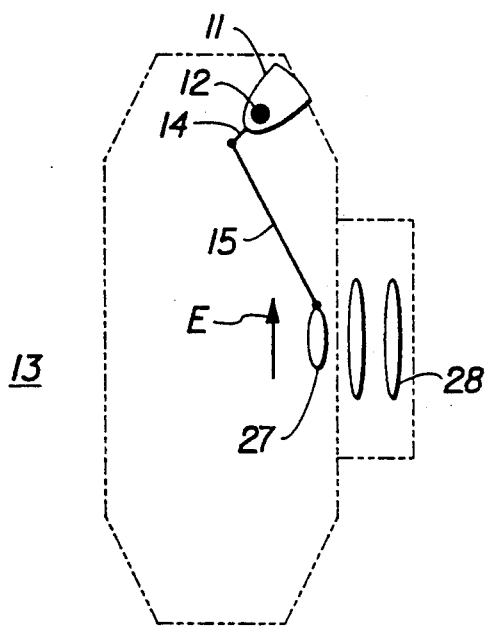
FIG. 6 is a side view of an alternate embodiment of the apparatus of this invention in the bounce mode.

FIG. 6 is a side view of an alternate embodiment of the apparatus of this invention in the bounce mode. Flash unit 11 has an arm 14 attached thereto. Flash unit 11 is connected through pivot 12 to camera 13. One end of arm 14 is connected to one end of lens shift lever 15. Lever 15 is shown as a straight solid member. It is obvious to one skilled in the art that lever 15 may assume a variety of shapes to fit within the body of camera 13. Compliant action may also be built into lever 15. The other end of lever 15 is connected to diopter lens 27. Conventional lens assembly 28 is positioned in front of diopter lens 27. The foregoing shows flash unit 11 in the bounce flash mode position with lens 27 providing a close up focus mode. In this mode, the light of focus zones work in conjunction with each other to provide an optimum image range between 2½ and 8 feet.

Figure 7:
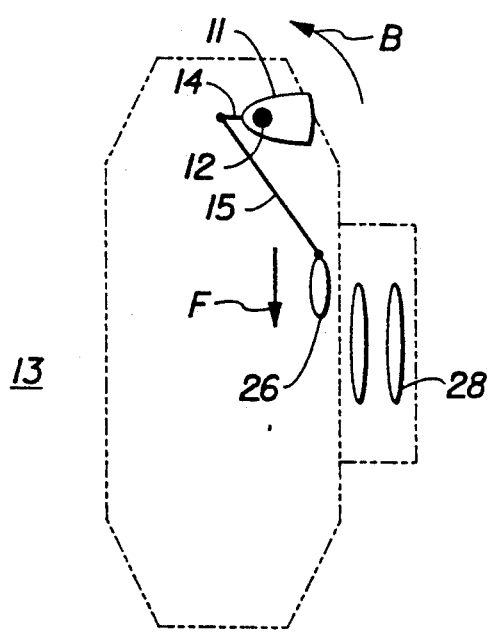
FIG. 7 is a side view of an alternate embodiment of the apparatus of this invention in the normal mode.

FIG. 7 is a side view of an alternate embodiment of the apparatus of this invention in the normal mode. When one wanted to shift to the bounce flash mode and close up focus mode (shown in FIG. 6) to the normal flash mode and the normal focus mode (shown in FIG. 7) one would push flash unit 11 in the direction shown by arrow A. Arm 14 would rotate about pivot 12 causing lever 15 to retract diopter lens 27 in the direction shown by arrow E into a normal focus mode position. If one wanted to shift from the normal focus mode position (shown in FIG. 6) one would push flash unit 11 in the direction shown by arrow B. Arm 14 would rotate about pivot 12 causing lever 15 to move diopter lens 27 in the direction shown by arrow F into a close up focus mode position.

The above specification describes a new and improved manually set bounce flash with focus set system. It is realized that the above description may indicate to those skilled in the art additional ways in which the principals of this invention may be used without departing from the spirit. It is, therefore, intended that this invention be limited only by the scope of the appended claims.

What is claimed is:

1. A camera comprising a variable focal length lens adjustable to increase or decrease its focal length, and a flash unit, is characterized by:
    means supporting said flash unit for movement between a normal position facing the same direction as said lens and a bounce flash position angled with respect to the direction said lens faces; and
    means coupling said supporting means and said lens for decreasing the focal length of said lens as said flash unit is moved from its normal position to its bounce flash position and for increasing the focal length of the lens as the flash unit is swinging from its bounce flash position to its normal flash position.

2. The camera claimed in claim 1, wherein said movement means may be incrementally positioned, while the focal length of said lens will be incrementally changed.

3. A camera having one or more movable lenses and a flash, said camera characterized by:
    means for incrementally positioning the flash from a normal flash position to a bounce flash position or from a bounce flash position to a normal flash position; and
    means coupled to said positioning means for adjusting the movable lens so as to shift the focus of the movable lens by reducing the focus distance of the movable lens as the flash is incrementally positioned into a bounce flash position and by increasing the focus distance of the movable lens as the flash is incrementally positioned towards a normal flash position.

4. The camera claimed in claim 3, wherein said positioning means comprises: a pivot that is coupled to the flash and the camera.

5. The camera claimed in claim 4, wherein said adjusting means comprises:
    a first member that is coupled to said pivot; and
    a second member that is coupled to said first member and to the movable lens so that when the flash changes position said first member pivots about said pivot and said second member shifts the focus of the movable lens.

6. The camera claimed in claim 3, wherein said adjusting means comprises:
    a member that is coupled to said pivot; and
    means coupled to said member and the movable lens for controlling the focus distance of the movable lens, wherein when said member pivots about said pivot said controlling means shifts the focus of the movable lens.

7. The camera claimed in claim 6, wherein said controlling means comprises:
    a switch that is coupled to said member;
    a solenoid comprising a coil and a bar, said coil is capable of receiving current when said switch is closed and said bar is coupled to the moving lens so that when said switch is closed said bar will shift the focus of the movable lens; and
    means for forcing the moving lens, said forcing means are coupled to the moving lens so that said forcing means will shift the focus of the movable lens when said switch is open.

8. The camera claimed in claim 7, wherein said forcing means is a spring.

9. A camera having one or more lenses, a movable diopter lens and a flash, said camera characterized by:
    means for positioning the flash from a normal flash position to a bounce flash position or from a bounce flash position to a normal flash position; and
    means coupled to said positioning means for moving the diopter lens into the optical path to reduce the focus distance of the lenses as the flash is positioned into a bounce flash position and moving out of the path so as to increase the focus distance of the lenses as the flash is positioned towards a normal flash position.

* * * * *